(12) United States Patent
Quick et al.

(10) Patent No.: US 10,518,394 B2
(45) Date of Patent: Dec. 31, 2019

(54) FLUID FILTER REMOVAL DEVICE AND METHOD OF USE

(71) Applicants: Robert Paul Quick, Edmonton (CA); Michael J. Quick, Edmonton (CA)

(72) Inventors: Robert Paul Quick, Edmonton (CA); Michael J. Quick, Edmonton (CA)

( * ) Notice: Subject to any disclaimer, the term of this patent is extended or adjusted under 35 U.S.C. 154(b) by 0 days.

(21) Appl. No.: 15/865,080

(22) Filed: Jan. 8, 2018

(65) Prior Publication Data

US 2019/0210202 A1   Jul. 11, 2019

(51) Int. Cl.
  *B01D 35/30* (2006.01)
  *B25B 27/00* (2006.01)
  *B01D 35/31* (2006.01)

(52) U.S. Cl.
  CPC .......... *B25B 27/0042* (2013.01); *B01D 35/30* (2013.01); *B01D 35/31* (2013.01); *B01D 2201/24* (2013.01)

(58) Field of Classification Search
  CPC .. B01D 35/31; B01D 2201/24; B25B 27/0042
  USPC ......................................... 210/232; 81/121.1
  See application file for complete search history.

(56) References Cited

U.S. PATENT DOCUMENTS

| | | | |
|---|---|---|---|
| 3,385,141 A | 5/1968 | Norman | |
| 4,020,922 A * | 5/1977 | Klasel | B01D 35/31 141/314 |
| 4,266,452 A | 5/1981 | Crist | |
| 4,763,620 A * | 8/1988 | Zastocki | B01D 35/31 123/196 A |
| 5,271,299 A | 12/1993 | Wadsworth | |
| 5,469,935 A | 11/1995 | Hewuse | |
| 5,623,755 A * | 4/1997 | Childress | B01D 35/31 141/114 |
| 6,056,874 A * | 5/2000 | Goodman | F16N 31/002 137/312 |
| 6,227,078 B1 | 5/2001 | Lemmo, Jr. | |
| 6,401,574 B1 | 6/2002 | Myers | |
| 7,107,878 B1 | 9/2006 | Jerantowski | |
| 7,241,385 B1 | 7/2007 | Cline | |
| 7,340,979 B2 | 3/2008 | Sawyer | |
| 2004/0226878 A1 | 11/2004 | Cline | |
| 2005/0056124 A1 * | 3/2005 | Zulauf | B01D 35/30 81/120 |
| 2006/0053983 A1 | 3/2006 | Groetsch | |
| 2008/0276763 A1 | 11/2008 | Greenberg | |
| 2009/0218273 A1 | 9/2009 | Pummill | |
| 2012/0091054 A1 | 4/2012 | Pipher | |
| 2012/0198970 A1 | 8/2012 | Robidoux | |

* cited by examiner

*Primary Examiner* — Thomas M Lithgow (74) *Attorney, Agent, or Firm* — Charles Runyan (57) ABSTRACT

A fluid filter removal device includes a fluid catch configured to circumscribe an outer surface of a fluid filter, a filter spacer configured to maintain a minimum separation between the outer surface of the fluid filter and an inner surface of the fluid catch when at least a portion of the fluid filter is circumscribed by the fluid catch, and a fluid filter sheath, fixed and hydraulically sealed to the fluid catch proximate the filter exit end of the fluid catch. The fluid filter removal device provides a device and method for removal of oil or fuel filters, and to contain contaminated fluids, on automotive, heavy and other types of equipment to eliminate contamination to the environment as well as contamination to vehicles and users changing a fluid filter.

20 Claims, 6 Drawing Sheets

FLUID FILTER REMOVAL DEVICE AND METHOD OF USE

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

1. Field of the Invention

The present invention relates generally to the field of oil and fuel filter removal tools and more specifically relates to a fluid filter removal device and method of use.

2. Description of Related Art

Use of various types of vehicles and machinery such as passenger cars, heavy equipment, aircraft, and landscaping equipment among others, requires the use of petroleum based products. These are often provided in liquid form as fuel or lubricating oil. These liquids may become contaminated with debris and other foreign matter, and as a result, may require filtration to extend the useful life of these products, maintain the cleanliness of engine parts, and reduce wear and tear on a vehicle or machinery. Filtration of these liquids is accomplished through the use of oil or fuel filters that become saturated with contaminants and thereby require replacement periodically. During replacement of the filters, the contaminated liquid contents are frequently spilled on the chassis, undercarriage or other nearby parts of the vehicle or machinery which is not desirable. Although a catch pan for the contaminated liquid is typically placed upon the ground in a region underneath the filter selected for removal, the contaminated liquid often misses the pan and lands upon the nearby ground. The contaminated liquid also frequently soils parts of the body and clothing of an individual changing the filter. In some instances, the liquid filter is located in a region of the vehicle or machine that is difficult to reach, and makes use of a catch pan even more challenging and increases the likelihood of contamination to a user, the vehicle parts, and the underlying soil. Contamination of the soil by petroleum based products contributes to ground water pollution, and is also harmful to plants and animals. Further, the necessary clean-up of spilled fluids is time consuming for vehicles which are needed to be in service continually, and clean-up of spills can be expensive. Therefore, there is a significant need for a device to reduce or eliminate spillage of liquids from a liquid filter during filter removal.

U.S. Pub. No. 2012/0198970 to Mark Robidoux relates to an oil filter removal tool with integral oil retaining reservoir. The described oil filter removal tool with integral oil retaining reservoir includes an oil filter removal tool having a base and axially compressible bellows attached at a liquid-tight joint to the base that telescopes over an oil filter being removed defining a container that collects excess oil during filter removal. The base has a filter engaging recess with a fluid passage enabling oil collected during removal to flow into a reservoir between the filter and base. Another reservoir formed between filter and bellows holds additional oil. A joint is formed by a seating arrangement having a configuration that also strengthens the tool. Bellows can compress to seal against a pan, ensuring oil in oil pan and filter that spills during filter removal remains within tool. After removal, the bellows can return to its uncompressed length providing a container sidewall extending outwardly beyond filter enabling collected oil to be transported and dumped into a container.

BRIEF SUMMARY OF THE INVENTION

In view of the foregoing disadvantages inherent in the known oil and fuel filter removal tools art, the present disclosure provides a novel fluid filter removal device and method of use. The general purpose of the present disclosure, which will be described subsequently in greater detail, is to provide a device to help remove oil or fuel filters on automotive, heavy and other types of equipment to eliminate contamination to the environment as well as contamination to vehicles and users who may be changing a fluid filter.

A fluid filter removal device and method are disclosed herein. The fluid filter removal device includes a catch, which is configured to circumscribe a casing outer surface of a fluid filter; the catch may have a filter entry end, a filter exit end, a catch outer surface and a catch inner surface, and further includes a filter spacer configured to maintain a minimum separation between the casing outer surface and the catch inner surface when the fluid filter is in an in-use condition, and also includes a fluid filter sheath which is fixed and hydraulically sealed to the catch proximate the filter exit end of the catch. The fluid filter sheath is effectively impervious to fluids contained in the filter, and may have a bottom surface, an inner surface and an outer surface. The fluid filter sheath may be configured to receive at least a portion of the fluid filter extending beyond the filter exit end of the catch, any spilled fluid from the fluid filter, and further configured to facilitate manual removal of the fluid filter.

A method of using a fluid filter removal device is also disclosed herein. The method of using the fluid filter removal device may comprise the steps of providing a device for minimizing fluid filter spillage, the device including a fluid catch configured to circumscribe a casing outer surface of the fluid filter, further including a filter spacer configured to maintain a minimum separation between the casing outer surface and a catch inner surface when at least a portion of the fluid filter is circumscribed by the fluid catch, and yet further including a fluid filter sheath fixed and hydraulically sealed to the fluid catch, the fluid filter sheath configured to allow for manual contact with the fluid filter through the fluid filter sheath and further to contain at least a portion of the fluid filter and fluid; breaking the fluid filter loose from a secured coupling in an installed condition, such that the fluid is left closed in the fluid filter and the fluid filter is left in a manually removable condition; inserting the fluid filter grip end of the fluid filter through the fluid catch and into the fluid filter sheath such that at least a portion of the fluid filter is circumscribed by the fluid catch; manually removing the fluid filter from the installed condition via the fluid filter sheath while catching any released fluid in the device; transporting the fluid filter and the released fluid while contained in the device; and disposing of the fluid filter and the released fluid by emptying the device.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, a fluid filter removal device, constructed and operative according to the teachings of the present disclosure.

DETAILED DESCRIPTION

As discussed above, embodiments of the present disclosure relate to oil and fuel filter removal tools, and more particularly to a fluid filter removal device and method as used to improve efficiency of removal of a fluid filter, and further to improve the ability to contain hazardous fluids during removal of a fluid filter after use, thus preventing contamination to a user and the environment.

Generally, the invention relates to a device to facilitate efficient removal of oil or fuel filters on automotive, heavy and other types of equipment to eliminate contamination to the environment, as well as contamination to vehicles and users who may be changing a fluid filter containing contaminated fluid. The fluid filter removal device includes a fluid catch having a filter entry end, a filter exit end, a catch outer surface, and a catch inner surface; the fluid catch configured to circumscribe the casing outer surface of a fluid filter such that a fluid filter grip end can pass through the catch inner surface from the filter entry end to the filter exit end along a circumscription axis. The catch in some applications may be flexible and manually deformable and further having a conical shape. In other instances, the catch may have a wall thickness between the catch outer surface and the catch inner surface proximate the filter entry end, which is greater than a second wall thickness between the catch outer surface and the catch inner surface proximate the filter exit end, whereby the wall thickness of the catch decreases closer to the filter exit end. This allows for easier manual contact of the catch around a fluid filter, yet greater flexibility of the catch near the filter exit end to be configured into different shapes to fit into confined spaces to access fluid filters in different locations on a vehicle.

Disposed upon an inner surface of the fluid catch is a filter spacer configured to maintain a minimum separation between the casing outer surface of the fluid filter and the catch inner surface when at least a portion of the fluid filter is circumscribed by the fluid catch. Upon removal of the fluid filter from a vehicle, the minimum separation provided by the filter spacer allows for fluid contained in the fluid filter to move into the minimum separation to prevent spillage and thereby maintain cleanliness of the fluid catch outer surface, nearby engine components, as well as the surrounding earth. A minimum separation provided by the filter spacer may be 2 mm or greater, and the filter spacer may include at least one of a plurality of ribs or studs fixed to the fluid catch. The filter spacer may be an array of spacers having any number of shapes, including but not limited to circular, elongated rib, rectangular, or square. The filter spacer may include at least 3 and typically between 3 and 5 elongated ribs disposed upon the inner surface of the catch and extending between the filter entry end and the filter exit end of the fluid catch.

The fluid filter removal device is further comprised of a fluid filter sheath having a fluid catch interface, a terminal end opposite the fluid catch interface, a sheath outer surface, and a sheath inner surface, the fluid filter sheath fixed and hydraulically sealed to the fluid catch at the fluid catch interface and proximate the filter exit end of the fluid catch. The fluid filter sheath is preferably made of a material impervious to a fluid; the fluid filter sheath configured to receive a portion of the fluid filter extending beyond the filter exit end of the fluid catch, further configured to prevent discharge of any of the fluid exiting the filter exit end of the fluid catch. The device is also configured to permit manual gripping of the fluid filter via the fluid filter sheath. A fluid the device is intended to be used with may be a petroleum-based fluid, such as fuel or oil; however, it may find use with other fluids. In order to accommodate a portion of the fluid filter in the fluid filter sheath and further contain any spilled fluids, a terminal end of the fluid filter sheath may extend at least 3 inches beyond the filter exit end of the fluid catch when the fluid filter is installed through the fluid catch during an in-use condition. The fuel filter sheath is manually deformable, and may be made of oleophobic or lipophobic materials, and further to be resistant to petroleum based fluids. In situations where the fluid filter is difficult to reach or visibility is limited, the fluid filter sheath may provide a tactile interface whereby a user may readily manually locate the grip end of the fluid filter.

In some instances, the fluid catch, filter spacer and fluid filter sheath may be made of the same or similar material. A non-limiting example may be silicone rubber resistant to petroleum based products. In other instances, the catch and filter spacer may be fabricated from a material having greater mechanical strength and rigidity, such as polyvinyl chloride, polypropylene or polyurethane as non-limiting examples, and the fluid filter sheath may be fabricated from a second material having greater flexibility than the fluid catch and filter spacer. The second material would also allow for manual contact with the grip end of the fluid filter and further have resistance to petroleum based products. The fluid filter sheath may have an inner surface with higher coefficient of friction than a material on the outer surface, increasing the ability of a user to grip a liquid fuel filter during removal. Thermal insulation to the body of a user may be provided through selection of materials having greater thermal resistance, thereby insulating a user's hands and other parts of the body from hot oil or fuels during removal of the filter.

Figure 1A:
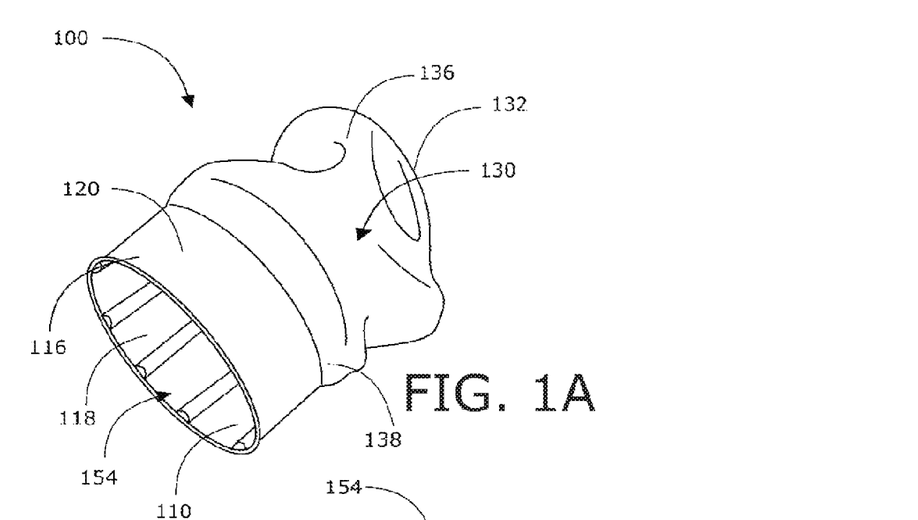
FIGS. 1A and 1B are front and back perspective views of the fluid filter removal device in a 'ready-for-use' condition, according to an embodiment of the disclosure.
Figure 1B:
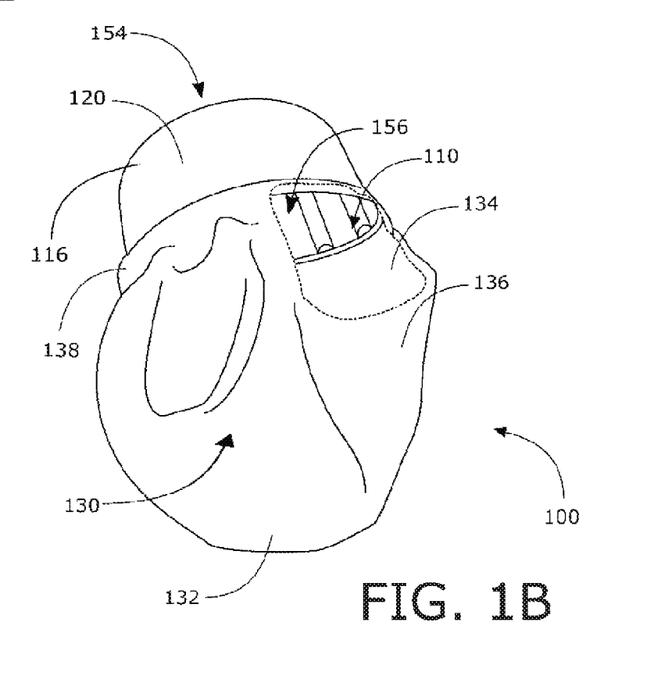

Referring now more specifically to the drawings by numerals of reference, there is shown in FIGS. 1A-6, various views of a fluid filter removal device 100. FIGS. 1A and 1B show front and back perspectives of a fluid filter removal device 100 in a 'ready-for-use' condition, according to an embodiment of the present disclosure. As illustrated, the fluid filter removal device (100) may include a fluid catch (120) configured to circumscribe the casing outer surface (60) of a fluid filter (50), the catch may have a filter entry end (154), a filter exit end (156), a catch outer surface (116) a catch inner surface (118); and a filter spacer (110), configured to maintain a minimum separation between the casing outer surface and the catch inner surface when at least a portion of the fluid filter may be circumscribed by the catch. The fluid filter removal device may also include a fluid filter sheath (130) having a fluid catch interface (138), a terminal end (132) opposite the fluid catch interface, a sheath outer surface (136), and a sheath inner surface (134); the fluid filter sheath fixed and hydraulically sealed to the fluid catch at the fluid catch interface and proximate the filter exit end (156) of the fluid catch. The fluid filter sheath is made of a material impervious to the fluid; the fluid filter sheath also configured to receive a portion of the fluid filter extending beyond the filter exit end of the fluid catch, and further configured to prevent discharge of any of the fluid exiting the filter exit end of the fluid catch, and yet further configured to permit manual gripping of the fluid filter via the fluid filter sheath.

Figures 2A, 2B:
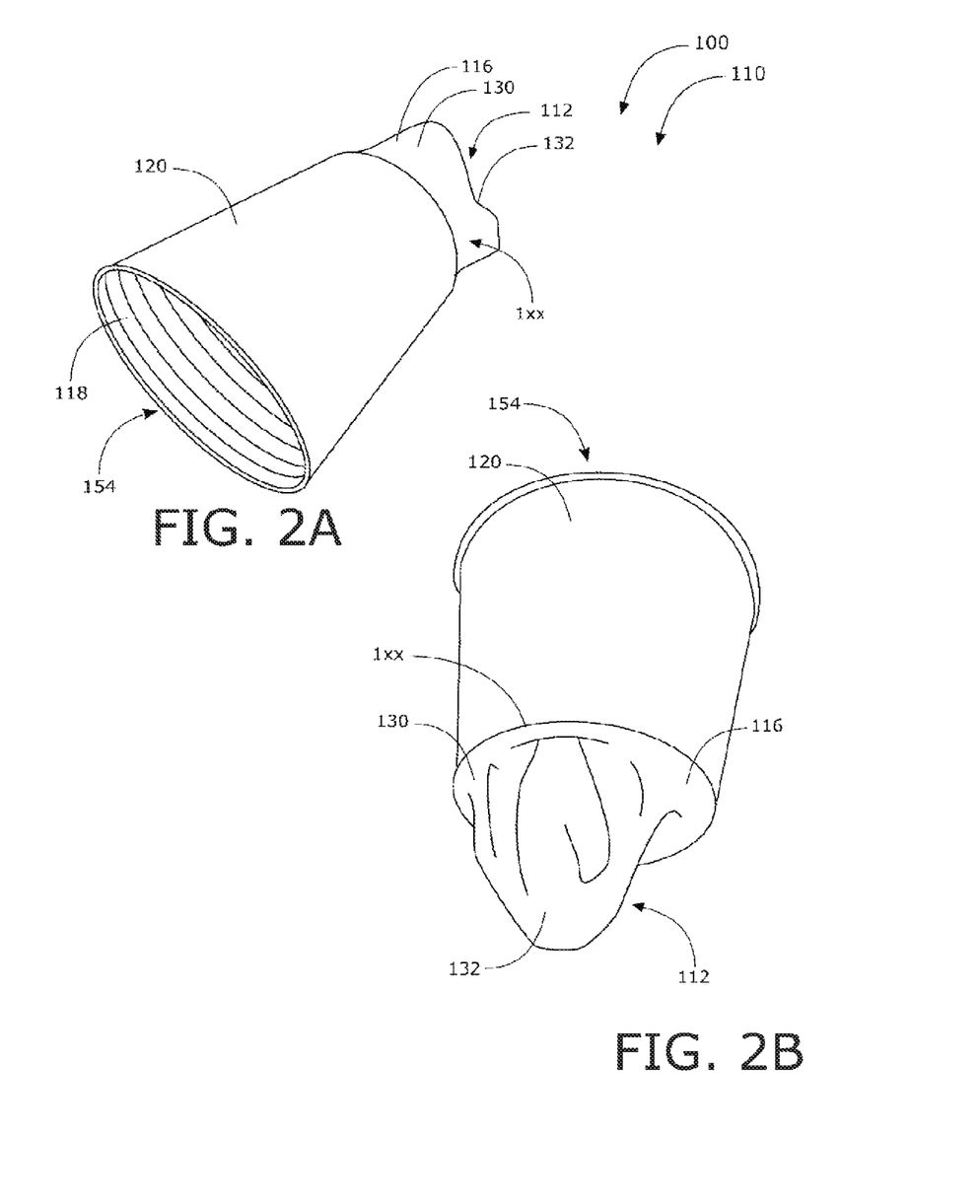
FIGS. 2A and 2B are front and back perspective views of the fluid filter removal device having a conical fluid catch and in a 'ready-for-use' condition, according to an embodiment of the present disclosure.

FIGS. 2A and 2B illustrate front and back perspective views of the fluid filter removal device (100) of FIG. 1, according to an embodiment of the present disclosure. As above, the fluid filter removal device (100) may include a fluid catch (120) configured to circumscribe the casing outer surface (60) of a fluid filter (50), the catch may have a filter entry end (154), a filter exit end (156), a catch outer surface (116) a catch inner surface (118); and a filter spacer (110), configured to maintain a minimum separation between the casing outer surface and the catch inner surface when at least a portion of the fluid filter may be circumscribed by the catch. The fluid filter removal device may also include a fluid filter sheath (130) having a fluid catch interface (138), a terminal end (132) opposite the fluid catch interface, a sheath outer surface (136), and a sheath inner surface (134), the fluid filter sheath fixed and hydraulically sealed to the fluid catch at the fluid catch interface and proximate the filter exit end (156) of the fluid catch, the fluid filter sheath made of a material impervious to the fluid, the fluid filter sheath also configured to receive a portion of the fluid filter extending beyond the filter exit end of the fluid catch, and further configured to prevent discharge of any of the fluid exiting the filter exit end of the fluid catch, and yet further configured to permit manual gripping of the fluid filter via the fluid filter sheath. Further illustrated in FIGS. 2A and 2B is a fluid catch having a first diameter proximate the filter entry end (154) and a second diameter proximate the filter exit end (156), whereby the first diameter is larger than the second diameter. This results in a conical shaped fluid catch.

Figures 3A, 3B:
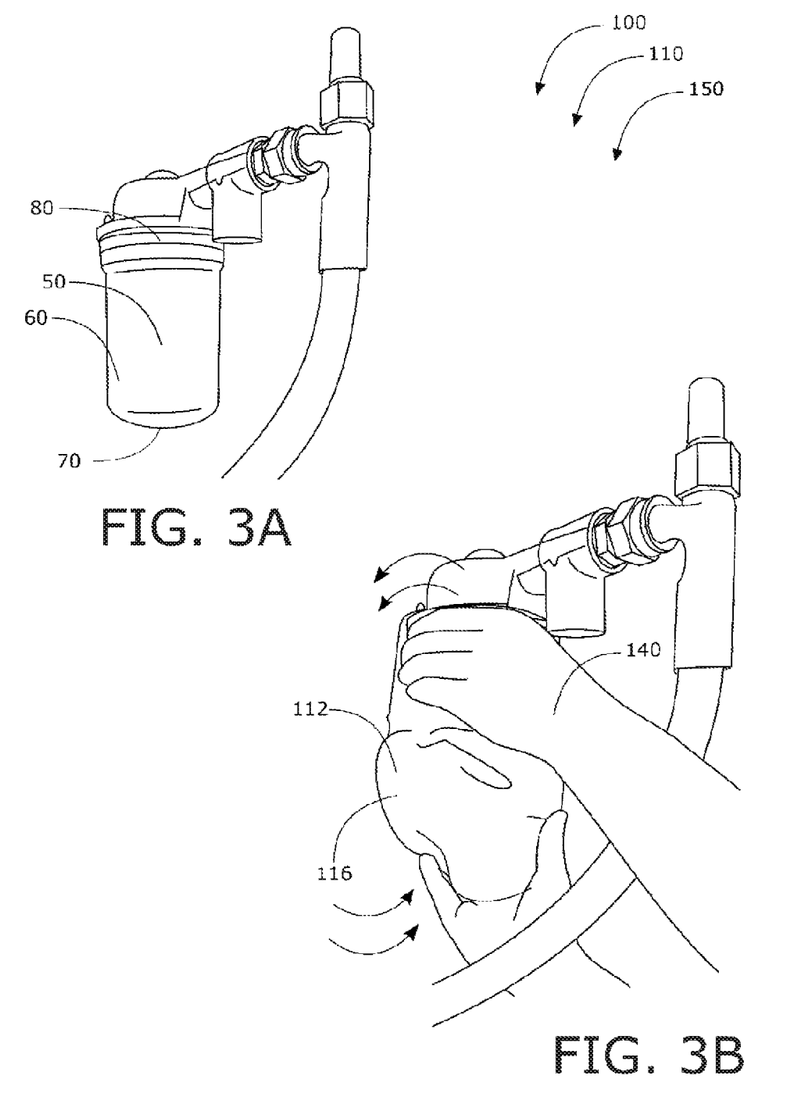
FIG. 3A is a perspective view of a fluid filter as installed on a vehicle, in an 'in-use' condition, according to an embodiment of the present disclosure.
FIG. 3B is a perspective view of a fluid filter removal device configured to circumscribe the fluid filter, in an 'in-use' condition with a fluid filter located inside the fluid filter removal device according to an embodiment of the present disclosure.

FIG. 3A shows a perspective view of a fluid filter (50) in a 'ready-for-use' condition, having an outer casing with a casing outer surface (60) and a fluid filter grip end (70) opposite a fluid filter installation end (80), according to an embodiment of the present disclosure.

FIG. 3B shows a perspective view of the fluid filter removal device (100) of FIG. 1, as installed and circumscribing the fluid filter (50) of FIG. 3A. A user's body (140) is also illustrated manipulating the fluid filter removal device 100 of FIG. 1 to complete removal of the fluid filter (50).

Figure 4A:
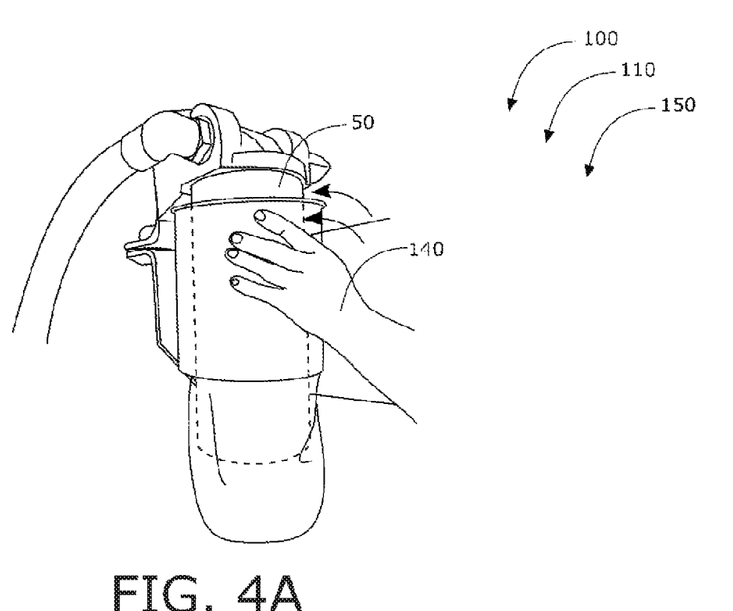
FIG. 4A is a perspective view of the fluid filter removal device of FIG. 1, circumscribing a fluid filter as depicted within the fluid filter removal device, according to an embodiment of the present disclosure.

FIG. 4A shows a perspective view of the fluid filter removal device 100 of FIG. 1, as installed and circumscribing the fluid filter (50) of FIG. 3A, wherein the terminal end of the fluid filter sheath is configured to extend at least 3 inches beyond the fluid filter grip end when the fluid filter is installed through the fluid catch during an in-use condition, according to an embodiment of the present disclosure.

Figure 4B:
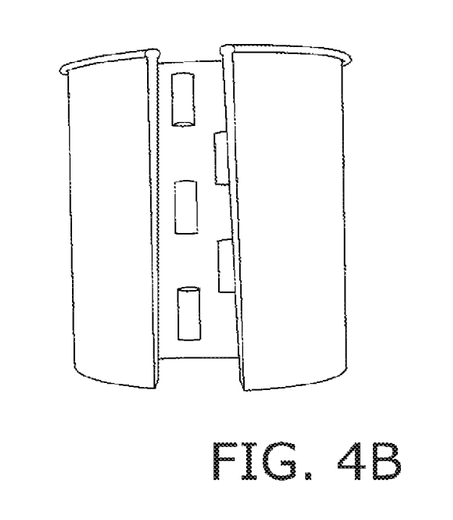
FIG. 4B is a perspective view of the fluid filter removal device of FIG. 1, having a fluid catch of variable cross sectional thickness according to an embodiment of the present disclosure.

FIG. 4B illustrates the fluid catch (120) of the fluid filter removal device (100) of FIG. 1 whereby the fluid catch has a first wall thickness between the catch outer surface (116) and the catch inner surface (118) proximate the filter entry end (154) and a second wall thickness between the catch outer surface and the catch inner surface proximate the filter exit end (156), and the first wall thickness is greater than the second wall thickness, according to an embodiment of the present disclosure.

Figure 5:
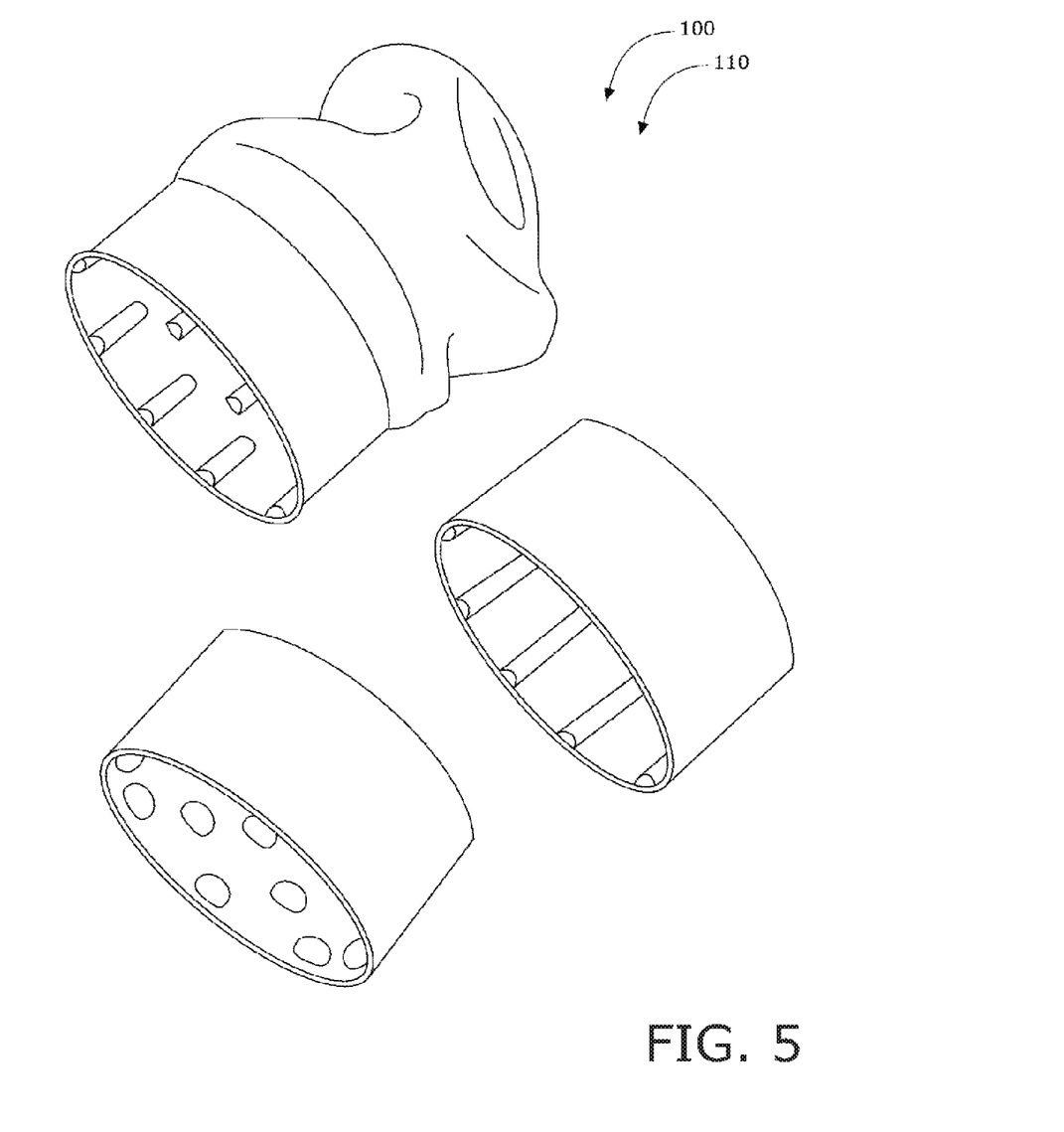
FIG. 5 is a perspective view of the fluid filter removal device illustrating various configurations of a filter spacer according to an embodiment of the present disclosure.

FIG. 5 shows a perspective view of the fluid filter removal device 100 of FIG. 1, according to an embodiment of the present disclosure. As above, the fluid filter removal device 100 may include a filter spacer further including at least one of a plurality of ribs, studs, bars, squares, or other similar shapes, fixed to the catch inner surface (118) of the fluid catch (120) and disposed between the casing outer surface (60) of the fluid filter (50) and the catch inner surface. Illustrated in FIG. 5 are non-limiting examples of a filter spacer comprised of a plurality of bars, ribs and studs.

Figure 6:
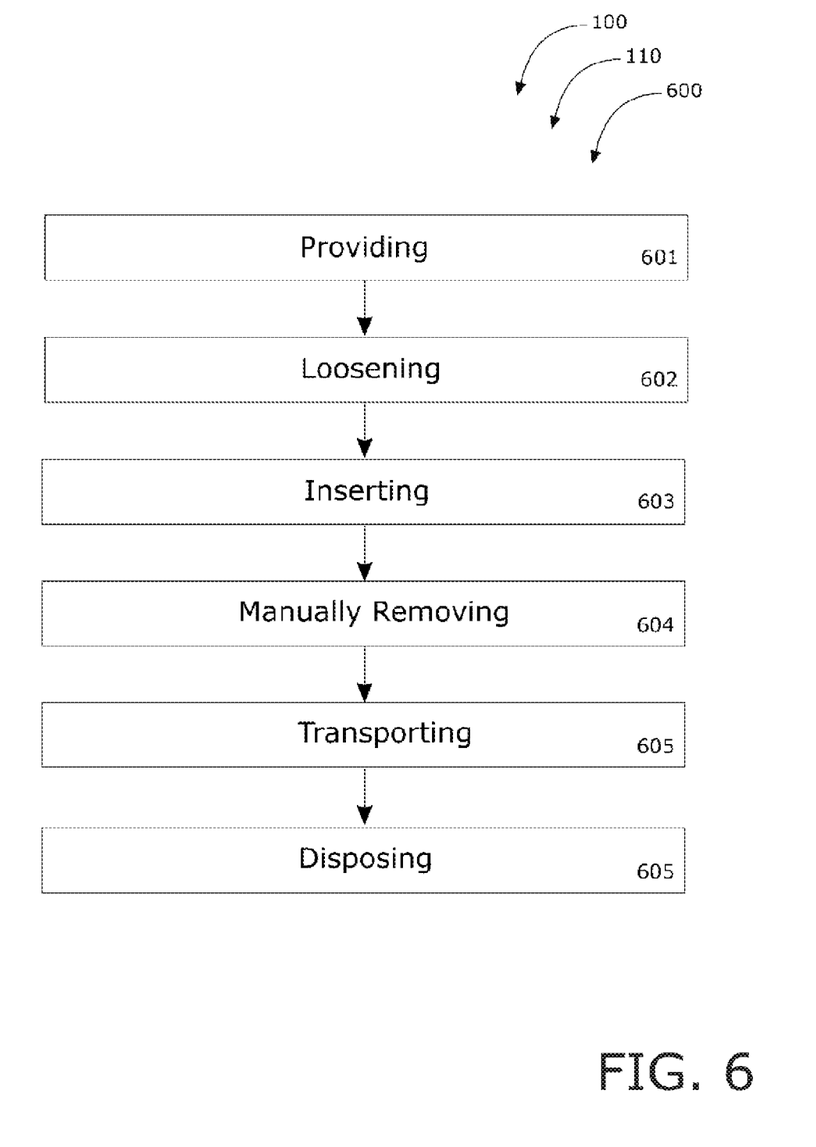
FIG. 6 is a flow diagram illustrating a method of use for the fluid filter removal device, according to an embodiment of the present disclosure The various embodiments of the present invention will hereinafter be described in conjunction with the appended drawings, wherein like designations denote like elements.

FIG. 6 is a flow diagram 600 illustrating a method for preventing spillage from a fluid filter, according to an embodiment of the present disclosure. In particular, the method for preventing spillage from a fluid filter may include one or more components or features of the fluid filter removal device 100 as described above. As illustrated, the method for preventing spillage from a fluid filter may include the steps of: step one (501), providing a device for minimizing fluid filter spillage, the device including a fluid catch configured to circumscribe a casing outer surface of the fluid filter, further including a filter spacer configured to maintain a minimum separation between the casing outer surface and a catch inner surface when at least a portion of the fluid filter is circumscribed by the fluid catch, and yet further including a fluid filter sheath fixed and hydraulically sealed to the fluid catch, the fluid filter sheath configured to allow for manual contact with the fluid filter through the fluid filter sheath and further to contain at least a portion of the fluid filter and fluid; step two (502), breaking the fluid filter loose from a secured coupling in an installed condition, such that the fluid is left closed in the fluid filter and the fluid filter is left in a manually removable condition; step three (503), inserting the fluid filter grip end of the fluid filter through the fluid catch and into the fluid filter sheath such that at least a portion of the fluid filter is circumscribed by the fluid catch; step four (504), manually removing the fluid filter from the installed condition via the fluid filter sheath while catching any released fluid in the device; step five (505), transporting the fluid filter and the released fluid while contained in the device; and step six (506), disposing of the fluid filter and the released fluid by emptying the device according to an embodiment of the present disclosure.

It should be noted that the steps described in the method of use can be carried out in many different orders according to user preference. The use of "step of" should not be interpreted as "step for", in the claims herein and is not intended to invoke the provisions of 35 U.S.C. § 112(f). It should also be noted that, under appropriate circumstances, considering such issues as design preference, user preferences, marketing preferences, cost, structural requirements, available materials, technological advances, etc., other methods for fluid filter removal means (e.g., different step orders within above-mentioned list, elimination or addition of certain steps, including or excluding certain maintenance steps, etc.), are taught herein.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A device for preventing spillage of a fluid from a fluid filter during removal of the fluid filter, the fluid filter having an outer casing with a casing outer surface and a fluid filter grip end opposite a fluid filter installation end, the device comprising:
    a fluid catch having a filter entry end a filter exit end, a catch outer surface and a catch inner surface said fluid catch configured to circumscribe the casing outer surface of the fluid filter such that the filter grip end can pass through the catch inner surface from the filter entry end to the filter exit end along a circumscription axis; and
    a filter spacer configured to maintain a minimum separation between the casing outer surface and the catch inner surface when at least a portion of the fluid filter is circumscribed by the fluid catch; and
    a fluid filter sheath having a fluid catch interface, a terminal end opposite the fluid catch interface, a sheath outer surface, and a sheath inner surface, the fluid filter sheath fixed and hydraulically sealed to the fluid catch at the fluid catch interface and proximate the filter exit end of the fluid catch, the fluid filter sheath made of a material impervious to the fluid, the fluid filter sheath configured to receive a portion of the fluid filter extending beyond the filter exit end of the fluid catch, further configured to prevent discharge of any of the fluid exiting the filter exit end of the fluid catch, and further configured to permit manual gripping of the fluid filter via the fluid filter sheath.

2. The device of claim 1, wherein the fluid catch, the filter spacer, and the fluid filter sheath are made from a first material.

3. The device of claim 1, wherein the fluid catch is manually deformable.

4. The device of claim 1, wherein the fluid catch has a first wall thickness between the catch outer surface and the catch inner surface proximate the filter entry end, and a second wall thickness between the catch outer surface and the catch inner surface proximate the filter exit end, and the first wall thickness is greater than the second wall thickness.

5. The device of claim 1, wherein the fluid catch and the filter spacer are made from a first material and the fluid filter sheath is made from a second material, the second material having greater compliance than the first material.

6. The device of claim 1, wherein the fluid is at least one of a petroleum or a solvent-based product.

7. The device of claim 1, wherein the fluid filter sheath is manually deformable.

8. The device of claim 1, wherein the filter spacer includes between 3 and 5 elongated ribs disposed upon the inner surface of the catch and extending between the filter entry end and the filter exit end.

9. The device of claim 1, wherein the filter spacer includes at least one of a plurality of ribs and a plurality of studs fixed to the fluid catch and disposed between the casing outer surface of the fluid filter and the catch inner surface when at least a portion of the fluid filter is circumscribed by the fluid catch.

10. The device of claim 1, wherein the sheath inner surface of the fluid filter sheath has a greater coefficient of friction than the sheath outer surface of the fluid filter sheath.

11. The device of claim 1, wherein the terminal end of the fluid filter sheath is configured to extend at least 3 inches beyond the fluid filter grip end when the fluid filter is installed through the fluid catch during an in-use condition.

12. The device of claim 1, wherein the device is made of oleophobic or lipophobic materials.

13. The device of claim 1, wherein the minimum separation between the casing outer surface and the catch inner surface is at least 2 millimeters.

14. The device of claim 1, wherein the fluid filter sheath includes a tactile interface having sufficient ductility to manually locate the grip end of the fluid filter.

15. The device of claim 1, wherein the device is thermally insulating.

16. The device of claim 1, wherein a portion of the fluid catch is conical in shape.

17. A device for preventing spillage of a fluid from a fluid filter during removal of the fluid filter, the fluid filter having an outer casing with a casing outer surface and a fluid filter grip end opposite a fluid filter installation end, the device comprising:
    a fluid catch having a filter entry end, a filter exit end, a catch outer surface, and a catch inner surface, said fluid catch configured to circumscribe the casing outer surface of the fluid filter such that the filter grip end can pass through the catch inner surface from the filter entry end to the filter exit end along a circumscription axis; and
    a filter spacer configured to maintain a minimum separation between the casing outer surface and the catch inner surface when at least a portion of the fluid filter is circumscribed by the fluid catch; and
    a fluid filter sheath having a fluid catch interface, a terminal end opposite the fluid catch interface, a sheath outer surface, and a sheath inner surface, the fluid filter sheath fixed and hydraulically sealed to the fluid catch at the fluid catch interface and proximate the filter exit end of the fluid catch, the fluid filter sheath made of a material impervious to the fluid, the fluid filter sheath configured to receive a portion of the fluid filter, extending beyond the filter exit end of the fluid catch, further configured to prevent discharge of any of the fluid exiting the filter exit end of the fluid catch, and further configured to permit manual gripping of the fluid filter via the fluid filter sheath; and wherein the fluid catch is manually deformable, wherein the fluid catch has a first wall thickness between the catch outer surface and the catch inner surface proximate the filter entry end and a second wall thickness between the catch outer surface and the catch inner surface proximate the filter exit end, and the first wall thickness is greater than the second wall thickness, wherein the fluid is at least one of a petroleum or a solvent-based product, wherein the fluid filter sheath is manually deformable, wherein the sheath inner surface of the fluid filter sheath has a greater coefficient of friction than the sheath outer surface of the fluid filter sheath, wherein the terminal end of the fluid filter sheath is configured to extend at least 3 inches beyond the filter exit end when the fluid filter is installed through the fluid catch during an in-use condition, wherein the device is made of oleophobic or lipophobic materials, wherein the minimum separation between the casing outer surface and the catch inner surface is at least 2 millimeters, wherein the fluid filter sheath includes a tactile interface having sufficient ductility to manually locate the grip end of the fluid filter, wherein the device is thermally insulating, and wherein a portion of the fluid catch is conical in shape.

18. The device of claim 17, further comprising a set of instructions; and wherein the device is arranged as a kit.

19. A method for preventing spillage of a fluid from a fluid filter during removal of the fluid filter, the fluid filter having an outer casing with a casing outer surface and a fluid filter grip end opposite a fluid filter installation end, the method comprising the steps of:

providing a device for minimizing fluid filter spillage, the device including a fluid catch configured to circumscribe a casing outer surface of the fluid filter, further including a filter spacer configured to maintain a minimum separation between the casing outer surface and a catch inner surface when at least a portion of the fluid filter is circumscribed by the fluid catch, and yet further including a fluid filter sheath fixed and hydraulically sealed to the fluid catch, the fluid filter sheath configured to allow for manual contact with the fluid filter through the fluid filter sheath and further to contain at least a portion of the fluid filter and fluid;

breaking the fluid filter loose from a secured coupling in an installed condition, such that the fluid is left closed in the fluid filter and the fluid filter is left in a manually removable condition;

inserting the fluid filter grip end of the fluid filter through the fluid catch and into the fluid filter sheath such that at least a portion of the fluid filter is circumscribed by the fluid catch;

manually removing the fluid filter from the installed condition via the fluid filter sheath while catching any released fluid in the device;

transporting the fluid filter and the released fluid while contained in the device; and disposing of the fluid filter and the released fluid by emptying the device.

20. The method of claim 19, wherein the manually removing the fluid filter from the installed condition includes manually unscrewing the fluid filter by contact with the filter through the fluid filter sheath.

* * * * *